May 10, 1960 — G. M. RAPATA — 2,936,141
RESILIENT MOUNT
Filed Sept. 23, 1957 — 2 Sheets-Sheet 1
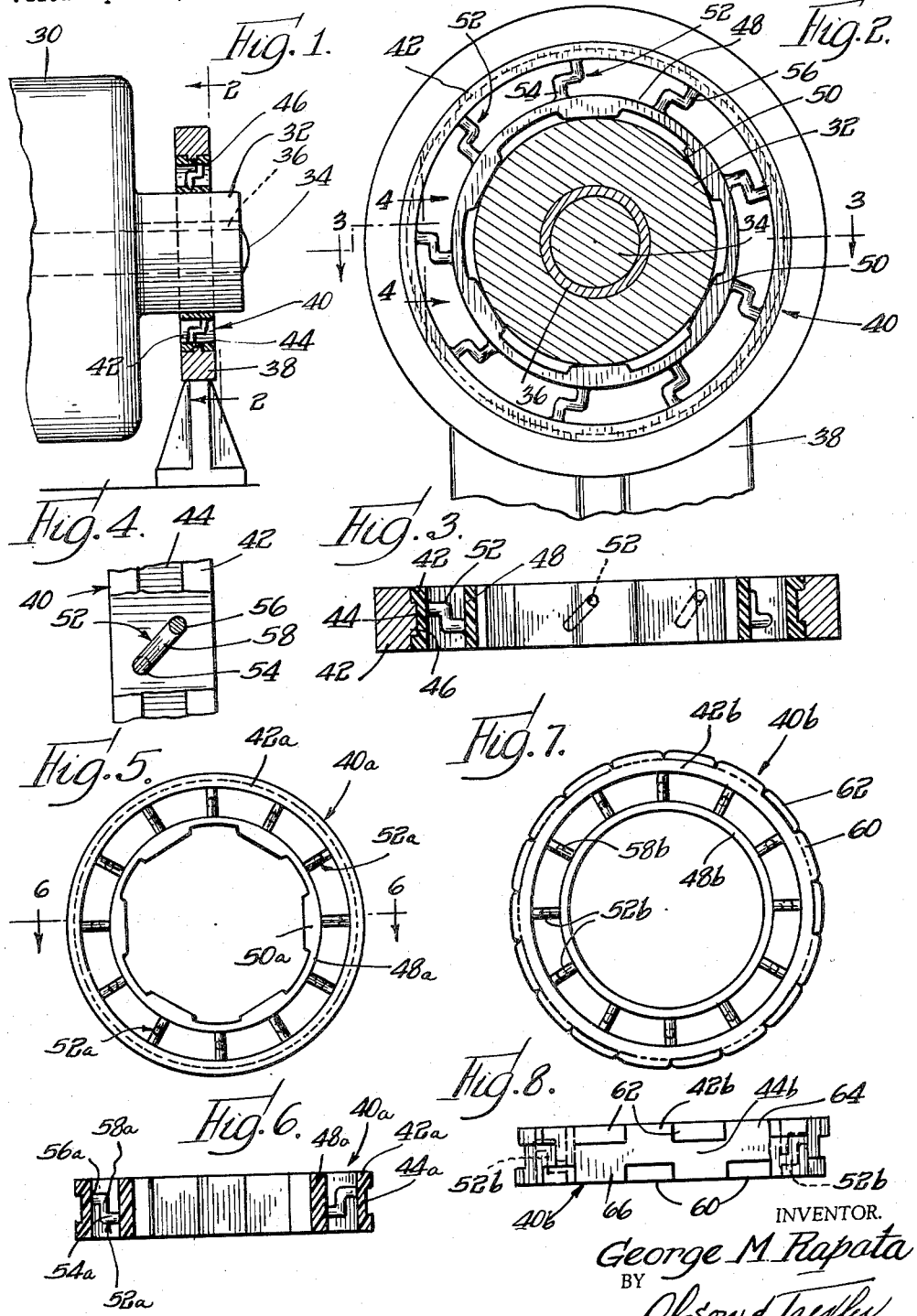
INVENTOR.
George M. Rapata
BY Olson & Trexler
attys.

May 10, 1960 G. M. RAPATA 2,936,141
RESILIENT MOUNT
Filed Sept. 23, 1957 2 Sheets-Sheet 2
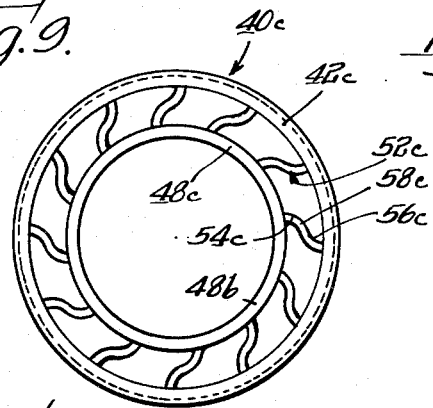
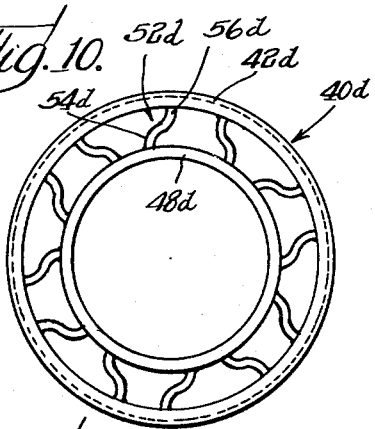
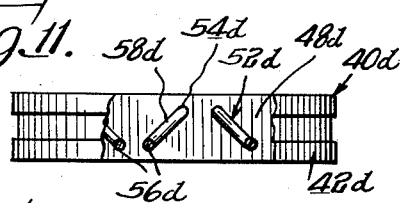
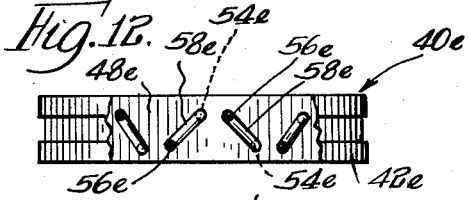
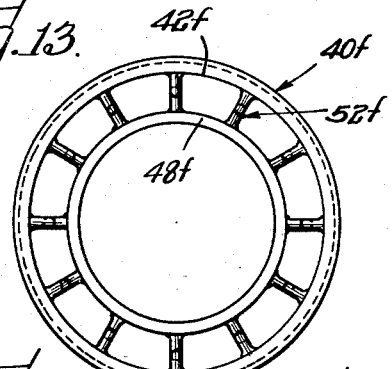
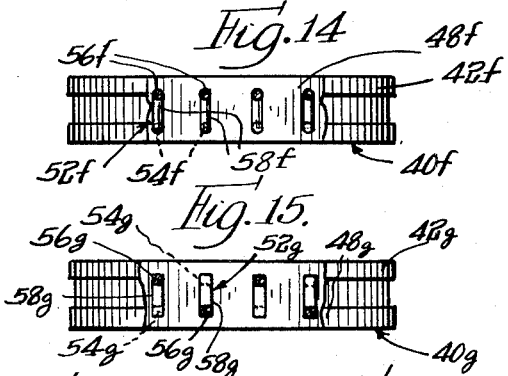
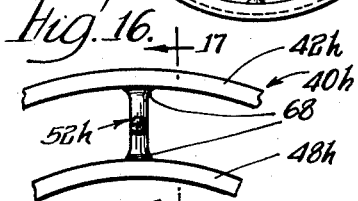
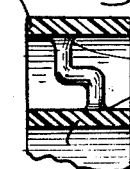
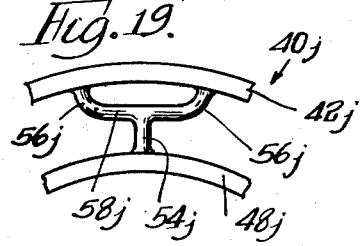
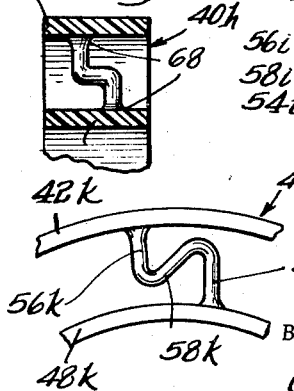
INVENTOR.
George M. Rapata
BY
Olson & Trexler
attys.

United States Patent Office 2,936,141
Patented May 10, 1960

2,936,141
RESILIENT MOUNT

George M. Rapata, Park Ridge, Ill., assignor to Illinois Tool Works, Chicago, Ill., a corporation of Illinois Application September 23, 1957, Serial No. 685,469

12 Claims. (Cl. 248—26)

This invention is concerned with the art of mounting motors, and more particularly with a resilient motor mount bushing for fractional horsepower electric motors.

In the past, motor mounts of this type have been commonly made of rubber rings bonded between an inner and outer steel ring. This three-piece construction obviously presents production problems and is susceptible to coming apart after extended periods of use. Furthermore, the rubber in such installations is of a solid nature. Although it may be reasonably resilient when manufactured, it tends to harden with age and to transmit progressively more vibrations from the motor to associated parts with the accompanying propagation of noise.

It is an object of this invention to provide a superior resilient motor mount.

More particularly, it is an object of this invention to provide a one-piece motor mount.

As a specific object of this invention, it is proposed to provide a one-piece molded motor mount.

Yet another object of this invention is to provide an integral, one-piece molded plastic motor mount employing supporting spokes having offset portions therein for facilitating controlled resilient movement of a motor supported by the mount.

Other and further objects and advantages of the present invention will be apparent from the following description when taken in connection with the accompanying drawings wherein:

Fig. 1 is a fragmentary side view partially in section showing a motor mounted in a mount constructed in accordance with the principles of this invention;

Fig. 2 is a cross-sectional view thereof taken substantially along the line 2—2 in Fig. 1;

Fig. 3 is a cross-sectional view taken along the line 3—3 in Fig. 2;

Fig. 4 is a fragmentary sectional view as taken along the line 4—4 in Fig. 2;

Fig. 5 is an end view of a slightly modified form of the motor mount;

Fig. 6 is a cross-sectional view therethrough as taken along the line 6—6 in Fig. 5;

Fig. 7 is an end view of another modified form of the motor mount bushing;

Fig. 8 is a side view of the bushing of Fig. 7;

Fig. 9 is an end view of a further modified form of the invention;

Fig. 10 is an end view of another form of the invention;

Fig. 11 is a side view of the invention as embodied in Fig. 10, with part being broken away to show the orientation of the spokes;

Fig. 12 is a view similar to Fig. 11 showing a slight modification thereof;

Fig. 13 is a further modification of the invention as shown in end view;

Fig. 14 is a side view thereof with part being broken away;

Fig. 15 is a view similar to Fig. 14 showing a slight modification thereof;

Fig. 16 is a fragmentary detail view of a portion of Fig. 13;

Fig. 17 is a fragmentary sectional view as taken along the line 17—17 in Fig. 16;

Fig. 18 is a fragmentary detail view similar to Fig. 17, but of a somewhat modified form of the invention;

Fig. 19 is a view similar to Fig. 16 and showing a modification of the invention; and Fig. 20 is a view similar to Fig. 19 and showing yet another form of the invention.

Referring now in greater particularity to the drawings, and first to Figs. 1 and 2, there will be seen an electric motor 30 having a hub 32 with a shaft 34 journaled therein in a suitable bearing 36. A supporting bracket 38 of more or less conventional design and made of metal or any other suitable material is provided for securing the hub through the intermediary of a motor mount bushing generally designated by the numeral 40.

The motor mount bushing as seen in Figs. 2–4 is an integral structure of molded plastic including an outer ring 42, preferably having a circumferential groove 44 receiving a complementary ring 46 in the bracket 38 for preventing endwise displacement of the mount or bushing.

An inner ring 48 is provided coaxial with the ring 42 and may have chordal lugs or projections 50 cooperable with the hub 32. These chordal projections may simply bear against the circumference of the hub, or the hub may be formed with recesses or splines therein for receipt of the projections for keying the hub, and hence the motor, to the resilient bushing or support. As will be apparent from the drawings, the projections 50 are of limited arcuate extent and are spaced equally arcuately about the inner ring 48 from which they project inwardly.

The two rings 42 and 48 are integrally connected by spokes 52. The entire motor mount or bushing 40 is integrally molded of plastic material, preferably nylon, and hence is inherently resilient. To impart further resiliency, the spokes 52 are of an offset or generally S-shape.

More particularly, the spokes 52 each comprise a pair of generally radial portions, the inner and outer portions respectively being identified as 54 and 56. These portions are offset from one another, and are interconnected by an offset intermediate section 58, generally perpendicular to the two substantially radial portions. As may be seen in Fig. 3, and as better may be seen in Fig. 4, the inner and outer portions 54 and 56 are respectively offset axially of the motor mount or bushing, as well as radially offset. Hence, the intermediate connecting section 58 is arranged diagonally of the axis of the motor mount or bushing. This provides a desired amount of resiliency in an axial direction as well as in radial directions or rotationally. As will be apparent, the intermediate sections 58 are subjected to twisting forces when one of the rings is displaced relative to the other, and, hence, these intermediate portions serve as torsion bars.

A modification of the invention is shown in Figs. 5 and 6. The parts are generally similar to those heretofore described, and are identified by similar numerals with the addition of the suffix a. Repetition of description therefore is unnecessary and would render this specification needlessly prolix. The essential difference is that the spokes 52a are oriented slightly differently. More particularly, the spokes are offset axially, but not arcuately. In other words, the intermediate or torsion bar portion 58a of each spoke is parallel to the axis of the motor mount or bushing. This allows substantially the same amount of radial deflection as in the previous form of the invention, but provides greater rigidity against axial deflection. In addition, slightly greater rotational deflection is allowed. As will be appreciated, these features are advantageous under certain conditions.

Yet another embodiment of the invention is shown in Figs. 7 and 8. In this modification, the parts are similar to those heretofore described and are identified by similar numerals, with the addition of the suffix b. The spokes 52b may be oriented in any of the manners heretofore described or hereinafter to be described and, for illustrative purposes, are shown similar to those in Figs. 5 and 6, i.e., the intermediate or torsion bar portions 58b of the spokes are shown as parallel to the axis of the motor mount or bushing. The essential difference resides in the definition of the circumferential groove or recess 44b. Rather than having solid flanges extending continuously around the outer ring 42b on opposite sides of the recess, there are interrupted flanges, identified as 60 and 62. The interrupted flanges leave spaces 64 and 66. This structure is in some instances desirable for facilitating association of the motor mount or bushing with the bracket, as the bracket 38 in Fig. 1.

A further modification of the invention is shown in Fig. 9, similar parts in this instance being identified by similar numerals with the addition of the suffix c. This embodiment of the invention is quite similar to the embodiment of Fig. 1 except that the S shape of the spokes 52c is somewhat modified to avoid right-angle corners. In addition, the spokes are twisted or skewed somewhat from the position of Figs. 1-4 so that the inner and outer portions 54c and 56c, respectively, of the spokes are offset arcuately, but not axially.

Another embodiment of the invention is shown in Figs. 10 and 11. In this embodiment, the spokes may have substantially right-angle corners, as in the early embodiments of the invention, or may be somewhat rounded as shown, and in accordance with Fig. 9. The essential difference in this instance resides in the fact that alternate spokes are offset or skewed in opposite directions. More specifically, successive spokes are oriented at right angles to one another. In accordance with the embodiment of Figs. 10 and 11, all of the outer spoke portions 56d are offset in one direction axially from the corresponding inner spoke sections 54d.

A minor modification of the foregoing is shown in Fig. 12, the numerals in this instance having the suffix e appended thereto. The alternate spokes remain at right angles, as in Figs. 10 and 11, but successive outer portions 56e are axially offset, and correspondingly, successive inner portions 54e are axially offset. The intermediate or torsion bar portions 58e remain at right angles to one another in successive spokes.

The embodiment of Fig. 13 is similar to that of Fig. 5 except that the projections on the inner ring are omitted, the inner diameter of the ring 48f therefore being circular. The projections have not been shown in Figs. 7-12, and it will be understood that the provision of the projections may be desirable in some cases whereas a cylindrical center aperture may be desirable in other cases. In accordance with the embodiment of Fig. 13 and as shown also in Fig. 14, all of the spokes are offset in the same direction. Specifically, the intermediate or torsion bar portions 58f are directed in an axial direction with all of the outer portions 56f lying axially toward one side of the motor mount or bushing and with all of the inner portions 54f lying toward the other side of the motor mount or bushing. As a variation thereof, and as shown in Fig. 15, alternate spokes are oppositely oriented. More particularly, the outer portions 56g of adjacent spokes are axially offset, while the inner portions 54g of adjacent spokes are similarly axially displaced from one another. In addition, the spokes in Fig. 15 are shown as having a square cross section, and it will be understood that any of the spokes herein could be of circular or any noncircular cross section, as dictated by use requirements.

A further modification of the invention is shown in Figs. 16 and 17, similar numerals being utilized, with the addition of the suffix h. The distinguishing feature of this form of the invention is that the spoke is joined to the inner and outer rings 48h and 42h, respectively, by fillets 68. Accordingly, the junctions of the spokes to the rings are strengthened. Although the spokes are shown as offset only axially, and not radially, as in Figs. 4-6 and 13-15, it will be understood that the filleted feature is equally applicable to the skewed spokes, or those having both axial and arcuate offset, or those having only arcuate offset.

Another modification is shown in Fig. 18, similar numerals again being used, this time with the addition of the suffix i. The important feature in this embodiment of the invention resides in the intermediate or torsion bar portion 58i of the spokes 52i. The difference here is that the torsion bar portion of each spoke is of greater diameter than the inner and outer portions 54i and 56i. The spokes can be disposed in any of the manners heretofore disclosed.

In accordance with the modification of Fig. 19, similar numerals again being used, with the addition of the suffix j, the spokes are of Y shape. In a sense, the spokes are of S shape, but with an added extension on the torsion bar portion, and an extra outer portion 56j. In any event, the attachments of the spokes to the inner and outer rings are offset from one another, and may be offset in substantially any of the ways previously described, although the specific showing is of an arcuate offset.

Another modification of the invention is shown in Fig. 20, similar numerals again being used, the suffix k being appended in this instance. The spokes again are offset, and may be offset in any manner in accordance with the preceding examples of the invention. The distinguishing feature is that the torsion bar or intermediate portion 58k is doubled back somewhat, whereby to impart greater flexibility to the suspension.

It will now be apparent that I have herein presented an improved bushing or motor mount bearing for resiliently supporting an electric motor or the like. The mount is superior to conventional rubber mounts, since it is not solid, and cannot transmit vibrations to the extent that a solid mount does. Furthermore, the qualities of the mount as herein disclosed are less susceptible to adverse effects by aging of the mount. The natural resilient qualities of the plastic used, preferably nylon, coupled with the offset spokes provide a superior resilient bearing or support. Furthermore, by orientation of the spokes and by variation and configuration along the lines disclosed above, it is possible to control the resiliency and deflection in various directions.

The specific examples of the invention, as herein shown and described, are for illustrative purposes only. Various changes in structure will no doubt occur to those skilled in the art. For example, the inner and outer rings could be eccentric with relatively short spokes at the bottom to support a motor from below, with increasingly longer spokes provided toward the top. These and other variations are to be understood as forming a part of this invention insofar as they fall within the spirit and scope of the appended claims.

The invention is claimed as follows:

1. A one piece integral resilient mount such as for electric motors or the like comprising an outer ring of resilient deformable material having a predetermined thickness, substantially parallel annular spaced end surfaces and spaced inner and outer cylindrical surfaces; an inner ring of resilient deformable material having a predetermined thickness, substantially parallel spaced annular end surfaces and spaced inner and outer cylindrical surfaces and disposed within and concentric to said outer ring; and a plurality of interconnecting spokes each having an outer portion integral with said inner cylindrical surface of said outer ring and each having an inner portion integral with said outer cylindrical surface of said inner ring, said spokes having an individual cross section dimension less than the dimension between said annular end surfaces of said inner and outer rings and at least some of said spokes being configured so that an intermediate portion of said spokes traverses a radial plane perpendicular to the axis of the mount and substantially midway between the opposite end surfaces of the rings.

2. A resilient mount as set forth in claim 1 wherein the inner and outer portions are offset from one another.

3. A resilient mount as set forth in claim 2 wherein the inner and outer portions are offset axially of said rings and are disposed substantially entirely within the axial limits of said rings.

4. A resilient mount as set forth in claim 2 wherein the inner and outer portions are offset arcuately of said rings.

5. A resilient mount as set forth in claim 2 wherein said inner and outer portions are oblique of the mount axis each being offset both axially and radially of said rings and being disposed substantially entirely within the axial limits of said rings.

6. A resilient mount as set forth in claim 1 wherein said intermediate portion integrally interconnects each inner and outer portion is disposed and substantially tangent to a circle concentric with said inner and outer rings.

7. A resilient mount as set forth in claim 1 wherein each spoke includes an intermediate portion integrally joining said inner and outer portions, said intermediate portion being re-entrant.

8. A resilient mount as set forth in claim 1 wherein said intermediate portion integrally interconnects said inner and outer portions, said intermediate portion being thicker than said inner and outer portions.

9. A one piece integral resilient mount such as for electric motors or the like comprising an outer ring of resilient material, an inner ring of resilient material substantially concentric with said outer ring, and a plurality of resilient spokes integral with and interconnecting said inner ring and said outer ring, said spokes each having an inner portion and an outer portion respectively connected to said inner and outer rings and offset from one another, the outer portions of alternate spokes being offset axially in opposite directions relative to the respective inner portions.

10. A resilient mount as set forth in claim 9 wherein the inner and outer portions are further offset arcuately of said rings, thereby being oblique to the mount axis.

11. A one piece integral resilient mount such as for electric motors or the like comprising an outer ring of resilient material having a circumferential groove therein, an inner ring of resilient material substantially concentric with said outer ring, and a plurality of resilient spokes integral with and interconnecting said inner ring and said outer ring, said spokes each having an inner portion and an outer portion respectively integrally connected to said inner and outer rings and further including an axially offset midportion connecting said inner and outer portions.

12. A resilient mount as set forth in claim 11 wherein the circumferential groove is defined by a pair of resilient circumferential flanges on said outer ring, said flanges having arcuately spaced interruptions therein, and the interruptions of the two flanges being arcuately offset.

References Cited in the file of this patent

UNITED STATES PATENTS

| | | |
|---|---|---|
| 1,082,600 | Leib | Dec. 30, 1913 |
| 1,167,757 | Hess | Jan. 11, 1916 |
| 1,286,369 | McCourt | Dec. 3, 1918 |
| 1,573,441 | Blakely | Feb. 16, 1926 |
| 2,112,473 | Tolerton | Mar. 29, 1938 |
| 2,756,013 | Cunningham | July 24, 1956 |